US012133260B2

(12) United States Patent
Zhang (10) Patent No.: US 12,133,260 B2
(45) Date of Patent: Oct. 29, 2024

(54) METHOD FOR SHARING CHANNEL OCCUPANCY TIME USING LISTEN BEFORE TALK CATEGORY 1 AND DEVICE (71) Applicant: GUANGDONG OPPO MOBILE TELECOMMUNICATIONS CORP., LTD., Guangdong (CN)

(72) Inventor: Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 315 days.

(21) Appl. No.: 17/704,665

(22) Filed: Mar. 25, 2022

(65) Prior Publication Data
US 2022/0217777 A1 Jul. 7, 2022

Related U.S. Application Data (63) Continuation of application No. PCT/CN2019/115448, filed on Nov. 4, 2019.

(51) Int. Cl.
H04W 74/0816 (2024.01)
H04W 72/0446 (2023.01)
H04W 74/00 (2009.01)
H04W 74/08 (2009.01)

(52) U.S. Cl.
CPC ... H04W 74/0816 (2013.01); H04W 72/0446 (2013.01); H04W 74/002 (2013.01); H04W 74/0866 (2013.01)

(58) Field of Classification Search
None
See application file for complete search history.

(56) References Cited

U.S. PATENT DOCUMENTS

| 2019/0239224 | A1  | 8/2019  | Yerramalli et al. |
| 2020/0053670 | A1* | 2/2020  | Jung ............... H04W 56/00 |
| 2021/0282182 | A1* | 9/2021  | Nogami ........... H04L 1/1614 |
| 2021/0368351 | A1* | 11/2021 | Cui ................. H04W 74/002 |
| 2022/0060305 | A1* | 2/2022  | Ijaz ................. H04L 5/0082 |

(Continued)

FOREIGN PATENT DOCUMENTS

| CN | 108366431 | 8/2018 |
| CN | 109479319 | 3/2019 |

(Continued)

OTHER PUBLICATIONS

Nokia, "Feature Leads Summary on Channel Access Procedures", Aug. 2019, 3GPP Draft; R1-190710, pp. 1-26.*

(Continued)

*Primary Examiner* — Adnan Baig
(74) *Attorney, Agent, or Firm* — Hodgson Russ LLP (57) ABSTRACT A method for sharing channel occupancy time (COT) using listen before talk category 1 (LBT CAT1) and a device are provided in implementations of the disclosure. The method includes the following. A first device establishes an initiation COT (INIT_COT). The first device shares the INIT_COT with a second device, where the INIT_COT is obtained with the LBT CAT1 by the second device and is used for the second device to perform data transmission within the INIT_COT, and a time length of the data transmission is less than or equal to a time length X.

16 Claims, 5 Drawing Sheets

(56) References Cited

U.S. PATENT DOCUMENTS

2022/0272753 A1* 8/2022 Hakola .................. H04B 7/086
2022/0304059 A1* 9/2022 Lei ........................ H04W 74/08

FOREIGN PATENT DOCUMENTS

| CN | 110249701 | 9/2019 |
| WO | 2019139876 | 7/2019 |

OTHER PUBLICATIONS

Sony, "Channel access for NR unlicensed operations", May 2019, 3GPP Draft; R1-1906834, pp. 1-5.*

Ericsson, "Channel access for Msg3," 3GPP TSG-RAN WG2 #107bis, Tdoc R2-1913507, Oct. 2019.

Ericsson, "Physical layer procedures for NR unlicensed operation," 3GPP TSG RAN WG1 Meeting #92bis, R1-1805011, Apr. 2018.

Intel Corporation, "Summary of offline discussions configured grants for NR-U," 3GPP TSG RAN WG1 Meeting #95, R1-1814121, Nov. 2018.

WIPO, International Search Report for PCT/CN2019/115448, Jul. 22, 2020.

EPO, Communication for EP Application No. 19951275.7, Mar. 13, 2023.

CNIPA, First Office Action for CN Application No. 202210689604. 6, Jun. 27, 2023.

Nokia et al., "Feature Lead's Summary on Channel Access Procedures," 3GPP TSG RAN WG1 Meeting #98, R1-1909710, Aug. 2019.

Sony, "Channel access for NR unlicensed operations," 3GPP TSG RAN WG1 #96bis, R1-1906834, May 2019.

Google, "Discussion on channel access procedure," 3GPP TSG RAN WG1 #97, R1-1907374, May 2019.

EPO, Extended European Search Report for EP Application No. 19951275.7, Jul. 7, 2022.

* cited by examiner

METHOD FOR SHARING CHANNEL OCCUPANCY TIME USING LISTEN BEFORE TALK CATEGORY 1 AND DEVICE

CROSS-REFERENCE TO RELATED APPLICATION(S)

This application is a continuation of International Application No. PCT/CN2019/115448, filed on Nov. 4, 2019, the entire disclosure of which is incorporated herein by reference.

TECHNICAL FIELD

The disclosure relates to the technical field of communication, and in particular to a method for sharing channel occupancy time (COT) using listen before talk category 1 (LBT CAT1) and a device.

BACKGROUND

An unlicensed spectrum is a spectrum that is divided according to nations and regions and is available for communication of a radio device. Generally, the spectrum is regarded as a shared spectrum, i.e., communication devices in different communication systems can use the spectrum and may not to apply for an exclusive spectrum license from government as long as these communication devices satisfy regulatory requirements on the spectrum set by the nations or regions. In order to make all communication systems that use the unlicensed spectrum for wireless communication coexist in the spectrum in a friendly way, some nations or regions stipulate regulatory requirements that must be satisfied when the unlicensed spectrum is used. For example, in some regions, a communication device follows a principle of "listen before talk (LBT)". That is, before a communication device performs signal transmission on a channel in the unlicensed spectrum, the communication device may listen to the channel. If a listen result of the channel is that the channel is vacant, the communication device can perform signal transmission. If the listen result of the channel in the unlicensed spectrum is that the channel is occupied, the communication device cannot perform signal transmission.

In order to ensure fairness, in a transmission, a duration for the communication device to use the channel in the unlicensed spectrum for signal transmission cannot exceed a maximum channel occupancy time (MCOT). With development of wireless communication technology, a long term evolution (LTE) system and a 5th generation mobile networks or 5th generation wireless system (5G) new radio (NR) system may consider deploying the network in the unlicensed spectrum, to use the unlicensed spectrum for data service transmission.

SUMMARY

A method for sharing channel occupancy time (COT) using listen before talk category 1 (LBT CAT1) and a device are provided in implementations of the disclosure.

According to a first aspect, a method for sharing COT using LBT CAT1 is provided in implementations of the disclosure. The method includes the following. A first device establishes an initiation COT (INIT_COT). The first device shares the INIT_COT with a second device, where the INIT_COT is obtained with the LBT CAT1 by the second device and is used for the second device to perform data transmission within the INIT_COT, and a time length of the data transmission is less than or equal to a time length X.

According to a second aspect, a first device is provided in implementations of the disclosure. The first device includes a processor and a memory storing a computer program. The computer program is executed by the processor to cause the processor to establish an INIT_COT, and share the INIT_COT with a second device, where the INIT_COT is obtained with the LBT CAT1 by the second device and is used for the second device to perform data transmission within the INIT_COT, and a time length of the data transmission is less than or equal to a time length X.

BRIEF DESCRIPTION OF THE DRAWINGS

The following will give a brief introduction to the accompanying drawings used for describing implementations or the related art.

DETAILED DESCRIPTION

The following will describe technical solutions of implementations with reference to accompanying drawings.

The technical solutions in implementations of the disclosure can be applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, or a new radio (NR).

A terminal in implementations of the disclosure may refer to a user equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The terminal also may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, a relay device, an in-vehicle device, a wearable device, a terminal in the future 5G network, a terminal in a future evolved public land mobile network (PLMN), or the like, which will not be limited herein.

A network device in implementations of the disclosure may be a device that is used to communicate with the terminal. The network device may be a base transceiver station (BTS) in the GSM or CDMA system, a NodeB (NB) in the WCDMA system, an evolved NodeB (eNB or eNodeB) in the LTE system, or a radio controller in a cloud radio access network (CRAN) scenario. Alternatively, the network device also may be a relay device, an access point (AP), an in-vehicle device, a wearable device, a network device in the future 5G network, a network device in the future evolved PLMN, or one antenna panel or one group of antenna panels (including multiple antenna panels) in a base station in the 5G system. Alternatively, the network device also may be a network node constructing a next generation NodeB (gNB) or a transmission point (TP), such as a baseband unit (BBU), a distributed unit (DU), or the like, which will not be limited herein.

In some deployments, the gNB may include a centralized unit (CU) and a DU. The gNB also may include an active antenna unit (AAU). The CU achieves a part of functions of the gNB, and the DU achieves a part of functions of the gNB. For example, the CU is responsible for processing non-real-time protocols and services, to achieve functions of a radio resource control (RRC) layer and a packet data convergence protocol (PDCP) layer. The DU is responsible for processing physical-layer protocols and real-time services, to achieve functions of a radio link control (RLC) layer, a media access control (MAC) layer, and a physical (PHY) layer. The AAU achieves a part of processing functions of the PHY layer and related functions of radio frequency (RF) processing and active antennas. Since information of the RRC layer may be finally converted into information of the PHY layer or be obtained by transforming the information of the PHY layer, in this architecture, high-layer signaling, such as RRC-layer signaling, also can be considered as transmitted by the DU or by the DU and the AAU. It can be understood that, the network device may be a device that includes at least one of a CU node, a DU node, or an AAU node. In addition, the CU can be considered as a network device in an RAN or in a core network (CN), which will not be limited herein.

In implementations of the disclosure, the terminal or the network device includes a hardware layer, an operating system layer running above the hardware layer, and an application layer running above the operating system layer. The hardware layer includes a central processing unit (CPU), a memory management unit (MMU), a memory (also called main memory), or other hardware. The operating system may be any one or various computer operating systems that achieve service processing through processes, e.g., a Linux® operating system, a Unix® operating system, an Android® operating system, an iOS® operating system, a Windows® operating system, or the like. The application layer includes a browser, an address book, a word processing software, an instant messaging software, or other applications. Furthermore, a specific structure of the execution body of the method provided in implementations of the disclosure is not particularly limited herein, as long as the execution body can perform communication according to the method provided in implementations of the disclosure by running a program containing codes for realizing the method provided in implementations of the disclosure. For example, the execution body of the method provided in implementations of the disclosure may be a terminal or a function module that is in the terminal and can invoke and execute the program.

In addition, various aspects or features in the disclosure can be implemented as methods, apparatuses, or products that use standard programming and/or engineering techniques. The term "product" used in the disclosure covers a computer program accessible from any computer-readable device, carrier, or medium. For example, the computer-readable medium may include but is not limited to, a magnetic memory device (e.g., a hard disc, a floppy disc, or a tape), an optical disc (e.g., a compact disc (DC), or a digital versatile disc (DVD)), a smart card, or a flash memory device (e.g., an erasable programmable read-only memory (EPROM), a card, a stick, or a key driver). In addition, various memory mediums described herein may represent one or more devices for storing information and/or other machine-readable mediums. The term "machine-readable medium" may include but is not limited to, a wireless channel, or other various mediums that can store, contain, and/or carry instructions and/or data.

Figure 1:
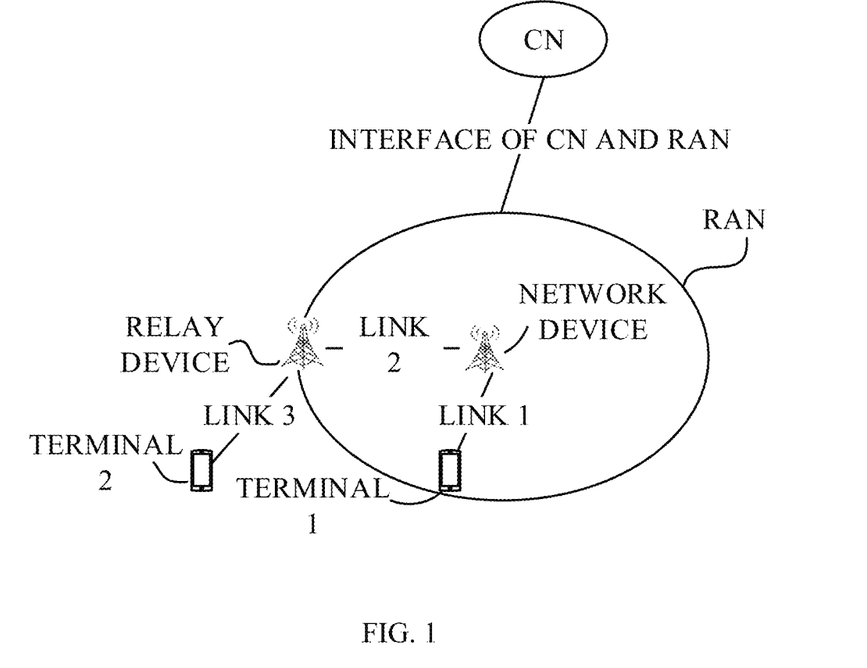
FIG. 1 is a schematic diagram illustrating beamforming provided in implementations of the disclosure.

FIG. 1 is a schematic diagram illustrating a communication system of the disclosure. In FIG. 1, the communication system may include at least one terminal (e.g., a terminal 1 or a terminal 2) and a network device. The network device is used to provide a communication service to the terminal and access a CN. The terminal can access the network by searching a synchronization signal, a broadcast signal, or the like transmitted by the network device, so as to communicate with the network. In FIG. 1, the terminal 1 establishes a link 1 with the network device, so that the terminal 1 can perform uplink (UL) and downlink (DL) transmission with the network device. For example, the network device can transmit a DL signal to the terminal 1 and also can receive a UL signal transmitted by the terminal 1.

In addition, the communication system in FIG. 1 also may include a relay device. The network device can provide the communication service to the relay device and access the CN. The relay device can access the network by searching the synchronization signal, the broadcast signal, or the like transmitted by the network device, so as to achieve network communication. In FIG. 1, the relay device establishes a link 2 with the network device, so that the relay device can transmit the DL signal to the network device and also can receive the UL signal transmitted by the network device. In this case, relative to the network device, the relay device can be regarded as a terminal.

In addition, the terminal and the relay device also can be regarded as a communication system. In FIG. 1, the relay device establishes a link 3 with the terminal 2, so that the relay device can transmit the DL signal to the terminal 2 and also can receive the UL signal transmitted by the terminal 2. In this case, relative to the terminal, the relay device can be regarded as a network device.

It can be understood that, the communication system may include one or more network devices. One network device can transmit data or control signaling to one or more terminals. Multiple network devices also can simultaneously transmit data or control signaling to one or more terminals.

Presently, in order to make all communication systems that use an unlicensed spectrum for wireless communication coexist in the spectrum in a friendly way, some nations or regions stipulate regulatory requirements that must be satisfied when the unlicensed spectrum is used. For example, a communication device follows a principle of "listen before talk (LBT)". That is, before a communication device performs signal transmission on a channel in the unlicensed spectrum, the communication device may listen to the channel. If a listen result of the channel is that the channel is vacant, the communication device can perform signal transmission. If the listen result of the channel in the unlicensed spectrum is that the channel is occupied, the communication device cannot perform signal transmission. In order to ensure fairness, in a transmission, a duration for the communication device to use the channel in the unlicensed spectrum for signal transmission cannot exceed a maximum channel occupancy time (MCOT).

On an unlicensed carrier, for a COT obtained by a base station, the base station can share the COT with the terminal for transmitting a UL signal or a UL channel. In other words, when the base station shares with the terminal the COT obtained by the base station, the terminal can use an LBT manner with a priority higher than that in which the terminal tries to obtain a channel, e.g., LBT category 2 (LBT CAT2), thereby obtaining a right to use the channel with great probability. However, at present, in new radio unlicensed (NR-U), it is not clear whether LBT CAT1 can be used when the base station or the terminal shares its own COT.

For the above problem, a method for sharing COT using LBT CAT1 is provided in implementations of the disclosure. The method will be described below in detail with reference to accompanying drawings.

Figure 2A:
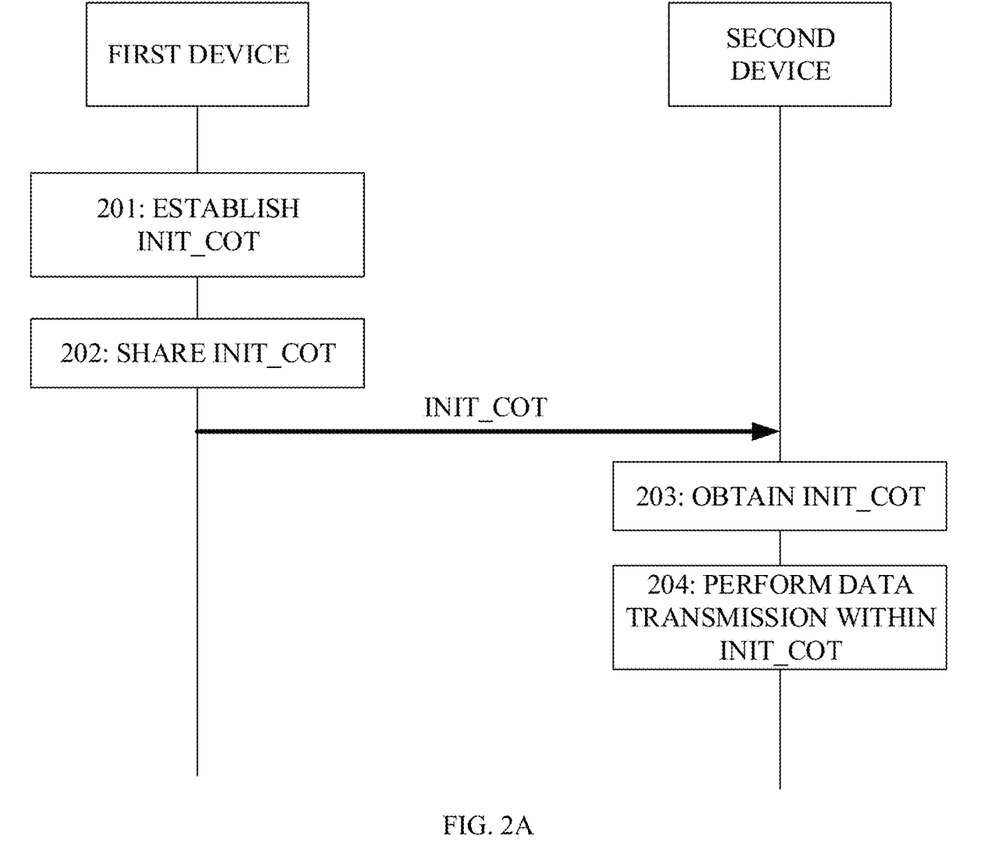
FIG. 2A is a schematic flow chart illustrating a method for sharing channel occupancy time (COT) using listen before talk category 1 (LBT CAT1) provided in implementations of the disclosure.

Referring to FIG. 2A, FIG. 2A is a schematic flow chart illustrating a method for sharing COT using LBT CAT1 provided in implementations of the disclosure. As illustrated in FIG. 2A, the method includes the following.

At 201, a first device establishes an initiation COT (INIT_COT).

The first device can obtain a channel in an unlicensed band by using an LBT mechanism, and has a right to use the channel within a time range. For example, a UE establishes the INIT_COT through LBT CAT4, where the INIT_COT has an upper limit, i.e., the MCOT, and a duration that the UE performs signal transmission cannot exceed the MCOT.

At 202, the first device shares the INIT_COT with a second device, where the INIT_COT is obtained with the LBT CAT1 by the second device and is used for the second device to perform data transmission within the INIT_COT, and a time length of the data transmission is less than or equal to a time length X.

The sharing means that the first device stops transmission to let the second device perform transmission, and this action can be stated through COT sharing in a protocol.

The LBT CAT1 specifically refers to a mechanism in which energy detection is not performed but only a gap no more than 16 μs is reserved.

In specific implementation, when the second device performs data transmission on an initiation channel obtained with the LBT CAT1, a condition needs to be satisfied, and there is a limitation on a data time length X of the data transmission, for example, the time length X can be constrained through a data type transmitted or a slot level.

At 203, the second device obtains the INIT_COT with the LBT CAT1, where the INIT_COT is established and shared with the second device by the first device.

At 204, the second device performs data transmission within the INIT_COT, where a time length of the data transmission is less than or equal to a time length X.

It can be seen that, in implementations of the disclosure, after the first device establishes the INIT_COT, the first device may share the INIT_COT with the second device, and the second device obtains the INIT_COT with the LBT CAT1 and performs data transmission within the INIT_COT, where the time length of the data transmission is less than or equal to the time length X. As can be seen, for the INIT_COT for a channel in NR-U that is generated by the first device, the first device and the second device can share the INIT_COT, and the transmission time length is constrained to avoid a resource occupancy conflict, which is beneficial to improve resource allocation efficiency of an unlicensed spectrum (NR-U).

In a possible implementation, X represents one or more values in a time interval set, where the set is a symbol-level set, a value of X is m*S, S represents a length of an orthogonal frequency division multiplexing (OFDM) symbol, and m is a positive rational number; or the set is a slot-level set, a value of X is m*SL, SL represents a slot length, and m is a positive rational number.

If X is selected to be OFDM symbol level, X=m*S, where S represents a length of an OFDM symbol, and m is a positive rational number. X may be a length of an integer number of symbols, e.g., 1 to 14 symbols. In addition, specifically, S may be a length of a reference symbol, i.e., the reference symbol is bound with a certain subcarrier spacing, for example, the length of the reference symbol is a corresponding symbol length of a subcarrier spacing of 15 kilo hertz (khz).

If X is selected to be slot-level, X=m*SL, where SL represents a slot length, and m is a positive rational number. X may be a length of an integer number of slots and also may be a length of a part of one slot, e.g., 0.125 slot, 0.25 slot, 0.5 slot, 1 slot, etc. In addition, specifically, SL may be a length of a reference slot, i.e., the reference slot is bound with a certain subcarrier spacing, for example, the length of the reference slot is a corresponding symbol length of the subcarrier spacing of 15 khz, i.e., fixed as 1 ms.

It can be seen that, in the implementation, X may represent one or more values in a symbol-level set or a slot-level set, and by using X to constrain time that the second device uses the INIT_COT to transmit data, it is possible to make the most of the INIT_COT, thereby ensuring a balance of channel resource occupation.

In a possible implementation, a value of S and a value of SL each are associated with the subcarrier spacing.

S represents a length of an OFDM symbol, and an absolute length of the OFDM symbol is related with the subcarrier spacing. The greater the subcarrier spacing, the less the symbol length. SL represents a slot length, and an absolute length of the slot is related with the subcarrier spacing. The greater the subcarrier spacing, the less the symbol length.

It can be seen that, in the implementation, the value of S and the value of SL each are associated with the subcarrier spacing, which can make the system indicate the value of X flexibly.

In a possible implementation, the value of X is associated with a data type transmitted within the INIT_COT by the second device.

The value of X is related with a data type transmitted after a switching point, where the data type can be classified according to a function of a transmitted signal or a channel type of transmitted data.

It can be seen that, in the implementation, the value of X is associated with the data type, and different data types and different data type classification manners each may affect the value of X, and thus the system can flexibly indicate the value of X.

In a possible implementation, the data type transmitted within the INIT_COT by the second device includes at least one of: a control signal, a broadcast signal, an access signal, or a reference signal. The control signal includes information carried by at least one channel of: a physical downlink control channel (PDCCH) or a physical uplink control channel (PUCCH). The broadcast signal includes information carried by a physical broadcast channel (PBCH) or system information carried by a physical downlink shared channel (PDSCH). The access signal includes information carried by a physical random access channel (PRACH). The reference signal includes at least one of: a channel state information-reference signal (CSI-RS), a sounding reference signal (SRS), or a synchronization signal (SS) and PBCH block (SSB).

The SSB means that a cell primary/secondary SS is somehow coupled with the PBCH in 5G and then appears in a form of an SS/PBCH resource block.

It can be seen that, in the implementation, the device can determine the value of X according to the data type transmitted, such that the system can flexibly indicate X.

In a possible implementation, an association relation between the value of X and the data type transmitted within the INIT_COT by the second device is as follows. On condition that the data type is the SSB, X represents 4 symbols and X=4*S, or X represents one slot and X=1*SL. On condition that the data type is the information carried by the PDCCH, X=m*S, where m=1, 2, or 3. On condition that the data type is the information carried by the PUCCH or the SRS, X=m*S, where m=1, 2, 3, 4, 5, 6, 7, 8, 9, 10, 11, 12, 13, or 14. On condition that the data type is the system information carried by the PDSCH, X=m*SL, where m=0.5 or 1.

On condition that the data type transmitted is the SSB, if X represents the symbol-level set, the symbol-level set includes 4 symbols; or if X represents the slot-level set, the slot-level set includes only one slot. When data information is carried by different channels, the rational number m for determining the value of X may be changed according to different channels.

In a possible implementation, the second device performs the data transmission within the INIT_COT on condition that the second device satisfies a first condition.

It can be seen that, in the implementation, by using the first condition to constrain the data transmission that is performed with the INIT_COT by the second device, the number of switching devices and a switching frequency can be controlled, and the INIT_COT also can be fully used.

In a possible implementation, the first condition includes at least one of: only one switching point existing between the second device and the first device after establishing the INIT_COT by the first device, where the only one switching point means that transmit-device switching occurs only once within the INIT_COT, i.e., switch from the first device to the second device; more than one transmit-device switching occurring within the INIT_COT, i.e., more than one switching point for the transmit device existing between the first device and the second device, where a maximum time length X_post allowed for transmission performed by a transmit device after each switching is less than or equal to a maximum time length X_pre allowed for transmission performed by a transmit device after a previous switching; or a total number of times transmit-device switching occurs within the INIT_COT being less than or equal to a maximum value.

The number (amount) of switching points refers to the number of times within one COT switching of a right to use COT occurs between devices.

In addition, the length of X has a minimum value, i.e., after the network device or the terminal obtains the COT with the LBT CAT1 again, if a length X allowed for transmission is less than the minimum value, at this point transmission is not allowed.

For example, the minimum value of X is a symbol length. X after each switching point is a half of X after a previous switching point, i.e., X1=2*X2=4*X3= . . . . If X after the nth switching is less than one symbol, the nth switching is not allowed.

It can be seen that, in the implementation, by constraining the sharing of the INIT_COT according to the number of switching points and time that the cannel can be used for the data transmission after switching, it is beneficial to control a frequency of device switching and maximize the use of the COT.

In a possible implementation, X_pre is at least two times of X_post.

The device switching stops when X_post determined according to X_pre is less than a certain value.

It can be seen that, in the implementation, a next-transmission maximum time length needs to be less than or equal to a half of a previous maximum time length, which can control a frequency of device switching and make greater use of the COT.

In a possible implementation, the first device is a terminal, and the second device is a network device; or the first device is the network device, and the second device is the terminal.

The device switching within the same INIT_COT refers to switching between the terminal and the network device, where the terminal may be a UE such as a phone, and the network device may be an NR-U base station.

It can be seen that, switching of the right to use the INIT_COT between the terminal and the device can make greater use of the INIT_COT and improve a utilization rate of a corresponding channel.

In a possible implementation, the first device is the terminal, and the second device is the network device. A resource for the terminal within the INIT_COT is a resource dynamically scheduled by the network device or a semi-persistently configured resource.

The dynamic scheduling of the network device is implemented through a dynamic resource scheduler, and resource allocation is performed according to a radio link status of an UL and DL channel. The semi-persistently configured resource means that the network device may receive or transmit data every period by using a previously appointed radio resource.

It can be seen that, in the implementation, the resource used within the INIT_COT by the first device is dynamically scheduled or semi-persistently configured by the second device, which can guarantee a data transmission rate of the device.

The following will describe in detail with specific examples.

Figure 2B:
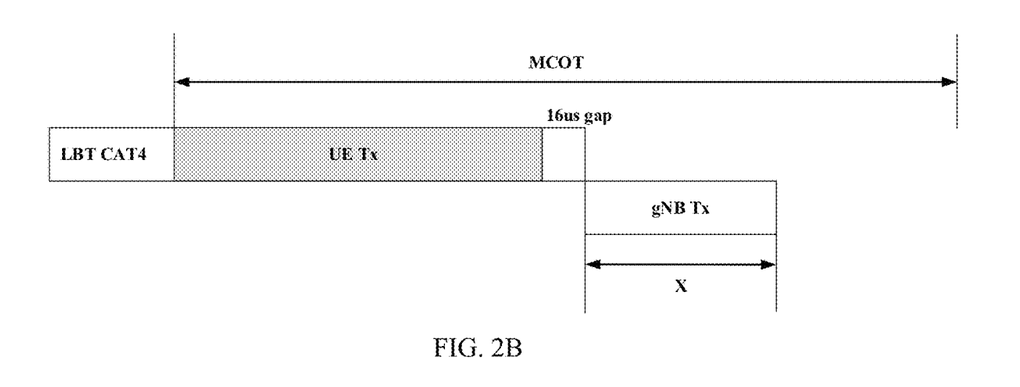
FIG. 2B is a schematic diagram illustrating a second device performing data transmission within an initiation COT (INIT_COT) on condition that the second device satisfies a condition provided in the disclosure.

In example 1, as illustrated in FIG. 2B, FIG. 2B is a schematic diagram illustrating a second device performing data transmission within an INIT_COT on condition that the second device satisfies a condition provided in the disclosure. As illustrated in FIG. 2B, a UE is the first device, and a gNB is the second device. The UE obtains the INIT_COT through LBT CAT4 and starts to perform transmission. When the UE shares the INIT_COT with the gNB, the gNB can start to perform the LBT CAT1 after transmission of the UE ends, where a gap not exceeding 16 μs needs to be reserved. Then the gNB immediately starts to perform transmission, and a transmission length may not exceed X. When a condition for the gNB to perform the data transmission within the INIT_COT is that only one switching point exists between the gNB and the UE after establishing the INIT_COT by the UE, and the only one switching point refers to that only one transmit-device switching is allowed within the INIT_COT, the gNB cannot return the COT to the UE after the gNB obtains the right to use the COT, i.e., multiple switching points are not allowed. Therefore, the INIT_COT automatically ends after the gNB performs transmission for the length X, even a total length of the INIT_COT does not reach a maximum allowable length of the COT (MCOT).

Figure 2C:
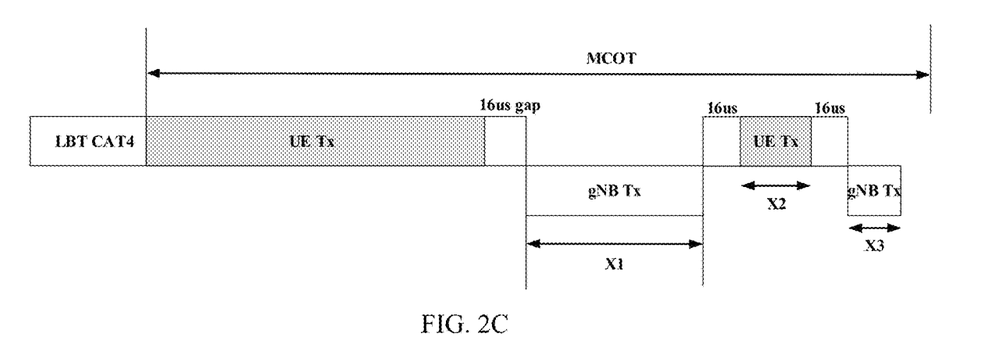
FIG. 2C is another schematic diagram illustrating a second device performing data transmission within an INIT_COT on condition that the second device satisfies a condition provided in the disclosure.

In example 2, as illustrated in FIG. 2C, FIG. 2C is another schematic diagram illustrating a second device performing data transmission within an INIT_COT on condition that the second device satisfies a condition provided in the disclosure. As illustrated in FIG. 2C, the UE is the first device, and the gNB is the second device. The UE obtains the INIT_COT through the LBT CAT4 and starts to perform transmission. When the UE shares the INIT_COT with the second device gNB, the gNB can start to perform the LBT CAT1 after the transmission of the UE ends, where the gap not exceeding 16 μs needs to be reserved. Then the gNB immediately starts to perform transmission, and a transmission length may not exceed X. When a condition for the gNB to perform the data transmission within the INIT_COT is that more than one switching point for the transmit device exists between the UE and the gNB, and a maximum time length allowed for transmission performed by the transmit device after each switching is less than or equal to a maximum time length allowed for transmission performed by the transmit device after a previous switching, it can be seen that in the FIG. 2C, a transmitted length X after each switching point is shorter than X after a previous switching point, and there are three switching points within the INIT_COT, where switch from the UE to the gNB occurs at the first switching point. The gNB starts to perform transmission for a maximum length X1 after the gNB obtains the INIT_COT with the LBT CAT1, and then switch from the gNB to the UE. In this case, the UE continues transmission after the UE obtains the INIT_COT again with the LBT CAT1, where a length that the UE performs transmission is X2 (X2<X1). Then at the third switching point, the gNB continues transmission after the gNB obtains the INIT_COT again with the LBT CAT1, and a maximum transmission length allowed for the gNB after the third switching point is X3 (X3<X2<X1).

Figure 2D:
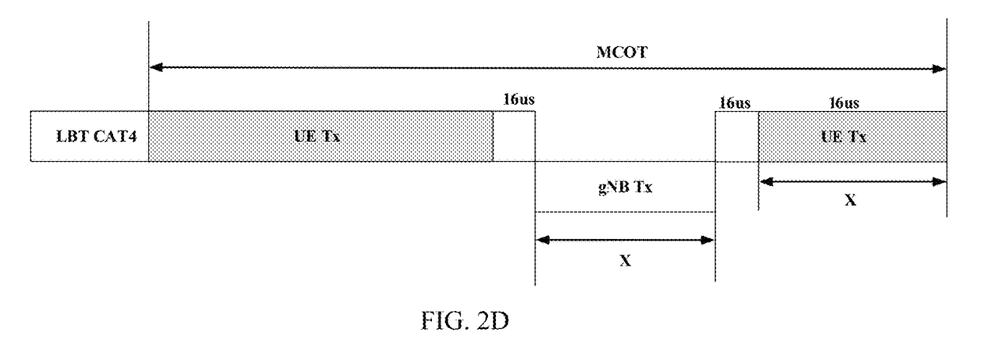
FIG. 2D is a yet another schematic diagram illustrating a second device performing data transmission within an INIT_COT on condition that the second device satisfies a condition provided in the disclosure.

In example 3, as illustrated in FIG. 2D, FIG. 2D is a yet another schematic diagram illustrating a second device performing data transmission within an INIT_COT on condition that the second device satisfies a condition provided in the disclosure. The UE is the first device, and the gNB is the second device. The UE obtains the INIT_COT through the LBT CAT4 and starts to perform transmission. When the UE shares the INIT_COT with the second device gNB, the gNB can start to perform the LBT CAT1 after transmission of the UE ends, and the gap not exceeding 16 μs needs to be reserved. Then the gNB immediately starts to perform transmission, and a transmission length may not exceed X. When a condition for the gNB to perform the data transmission within the INIT_COT is that a total number of times transmit-device switching occurs within the INIT_COT is less than or equal to a maximum value, there may be multiple switching points. However, in order to make switching not be frequent, the system can specify a maximum number of switching in this situation, for example, a maximum number of switching is 2 as illustrated in FIG. 2D.

Figure 3:
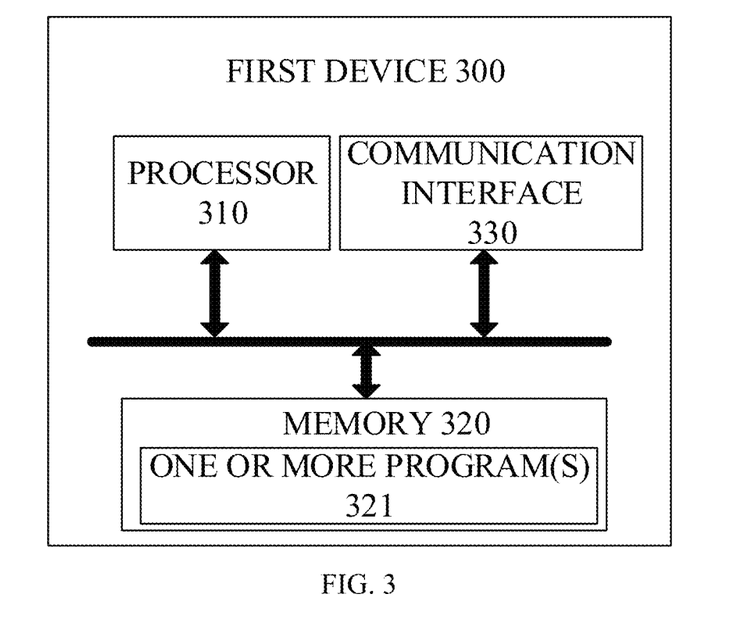
FIG. 3 is a schematic structural diagram illustrating a terminal provided in implementations of the disclosure.

In consistence with the implementations in FIG. 2A, referring to FIG. 3, FIG. 3 is a schematic structural diagram illustrating a first device 300 provided in implementations of the disclosure. As illustrated in FIG. 3, the first device 300 includes a processor 310, a memory 320, a communication interface 330, and one or more program (s) 321, where the one or more program (s) 321 is stored in the memory 320 and is configured to be performed by the processor 310, and the one or more program (s) 321 includes instructions used for performing the following operations.

An INIT_COT is established and shared with a second device by the first device. The INIT_COT is obtained with LBT CAT1 by the second device and is used for the second device to perform data transmission within the INIT_COT, and a time length of the data transmission is less than or equal to a time length X.

It can be seen that, in implementations of the disclosure, after the first device establishes the INIT_COT, the first device may share the INIT_COT with the second device, and the second device obtains the INIT_COT with the LBT CAT1 and performs the data transmission within the INIT_COT, where the time length of the data transmission is less than or equal to the time length X. As can be seen, for the INIT_COT for a channel in NR-U generated by the first device, the first device and the second device can share the INIT_COT, and the transmission time length is constrained to avoid a resource occupancy conflict, which is beneficial to improve resource allocation efficiency of an unlicensed spectrum (NR-U).

In a possible implementation, X represents one or more values in a time interval set, where the set is a symbol-level set, a value of X is m*S, S represents a length of an OFDM symbol, and m is a positive rational number; or the set is a slot-level set, a value of X is m*SL, SL represents a slot length, and m is a positive rational number.

In a possible implementation, a value of S and a value of SL each are associated with a subcarrier spacing.

In a possible implementation, the value of X is associated with a data type transmitted within the INIT_COT by the second device.

In a possible implementation, the data type transmitted within the INIT_COT by the second device includes at least one of: a control signal, a broadcast signal, an access signal, or a reference signal. The control signal includes information carried by at least one channel of: a PDCCH or a PUCCH. The broadcast signal includes information carried by a PBCH or system information carried by a PDSCH. The access signal includes information carried by a PRACH. The reference signal includes at least one of: a CSI-RS, an SRS, or an SSB.

In a possible implementation, an association relation between the value of X and the data type transmitted within the INIT_COT by the second device is as follows. On condition that the data type is the SSB, X represents 4 symbols and X=4*S, or X represents one slot and X=1*SL. On condition that the data type is the information carried by the PDCCH, X=m*S, where m=1, 2, or 3. On condition that the data type is the information carried by the PUCCH or the SRS, X=m*S, where m=1, 2, 3, 4, 5, 6, 7, 8, 9, 10, 11, 12, 13, or 14. On condition that the data type is the system information carried by the PDSCH, X=m*SL, where m=0.5 or 1.

In a possible implementation, the second device performs the data transmission within the INIT_COT on condition that the second device satisfies a first condition.

In a possible implementation, the first condition includes at least one of: only one switching point existing between the second device and the first device after establishing the INIT_COT by the first device, where the only one switching point means that transmit-device switching occurs only once within the INIT_COT, i.e., switch from the first device to the second device; more than one transmit-device switching occurring within the INIT_COT, i.e., more than one switching point for the transmit device existing between the first device and the second device, where a maximum time length X_post allowed for transmission performed by a transmit device after each switching is less than or equal to a maximum time length X_pre allowed for transmission performed by a transmit device after a previous switching; or a total number of times transmit-device switching occurs within the INIT_COT being less than or equal to a maximum value.

In a possible implementation, X_pre is at least two times of X_post.

In a possible implementation, the first device is a terminal, and the second device is a network device; or the first device is the network device, and the second device is the terminal.

In a possible implementation, the first device is the terminal, and the second device is the network device. A resource for the terminal within the INIT_COT is a resource dynamically scheduled by the network device or a semi-persistently configured resource.

Figure 4:
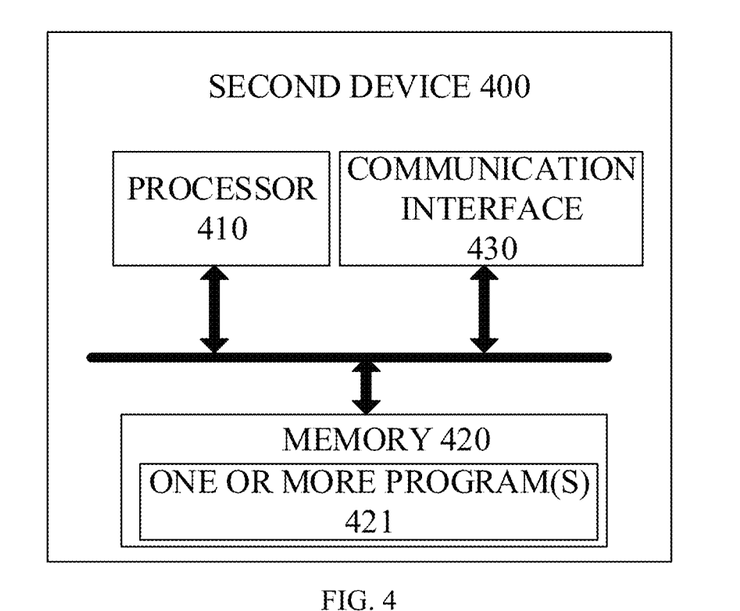
FIG. 4 is a schematic structural diagram illustrating a network device provided in implementations of the disclosure.

Referring to FIG. 4, FIG. 4 is a schematic structural diagram illustrating a second device 400 provided in implementations of the disclosure. As illustrated in FIG. 4, the second device 400 includes a processor 410, a memory 420, a communication interface 430, and one or more program (s) 421, where the one or more program (s) 421 is stored in the memory 420 and is configured to be performed by the processor 410, and the one or more program (s) 421 includes instructions used for performing the following operations.

An INIT_COT is obtained with LBT CAT1, where the INIT_COT is established and shared with the second device by a first device. Data transmission is performed within the INIT_COT, where a time length of the data transmission is less than or equal to a time length X.

It can be seen that, in implementations of the disclosure, after the first device establishes the INIT_COT, the first device may share the INIT_COT with the second device, and the second device obtains the INIT_COT with the LBT CAT1 and performs the data transmission within the INIT_COT, where the time length of the data transmission is less than or equal to the time length X. As can be seen, for the INIT_COT for a channel in NR-U generated by the first device, the first device and the second device can share the INIT_COT, and the transmission time length is constrained to avoid a resource occupancy conflict, which is beneficial to improve resource allocation efficiency of NR-U.

In a possible implementation, X represents one or more values in a time interval set, where the set is a symbol-level set, a value of X is m*S, S represents a length of an OFDM symbol, and m is a positive rational number; or the set is a slot-level set, a value of X is m*SL, SL represents a slot length, and m is a positive rational number.

In a possible implementation, a value of S and a value of SL each are associated with a subcarrier spacing.

In a possible implementation, the one or more program (s) 421 contains instructions used for performing the following: the value of X is associated with a data type transmitted within the INIT_COT by the second device.

In a possible implementation, the data type transmitted within the INIT_COT by the second device includes at least one of: a control signal, a broadcast signal, an access signal, or a reference signal. The control signal includes information carried by at least one channel of: a PDCCH or a PUCCH. The broadcast signal includes information carried by a PBCH or system information carried by a PDSCH. The access signal includes information carried by a PRACH. The reference signal includes at least one of: a CSI-RS, an SRS, or an SSB.

In a possible implementation, an association relation between the value of X and the data type transmitted within the INIT_COT by the second device is as follows. On condition that the data type is the SSB, X represents 4 symbols and X=4*S, or X represents one slot and X=1*SL. On condition that the data type is the information carried by the PDCCH, X=m*S, where m=1, 2, or 3. On condition that the data type is the information carried by the PUCCH or the SRS, X=m*S, where m=1, 2, 3, 4, 5, 6, 7, 8, 9, 10, 11, 12, 13, or 14. On condition that the data type is the system information carried by the PDSCH, X=m*SL, where m=0.5 or 1.

In a possible implementation, the second device performs the data transmission within the INIT_COT on condition that the second device satisfies a first condition.

In a possible implementation, the first condition includes at least one of: only one switching point existing between the second device and the first device after establishing the INIT_COT by the first device, where the only one switching point means that transmit-device switching occurs only once within the INIT_COT, i.e., switch from the first device to the second device; more than one transmit-device switching occurring within the INIT_COT, i.e., more than one switching point for the transmit device existing between the first device and the second device, where a maximum time length X_post allowed for transmission performed by a transmit device after each switching is less than or equal to a maximum time length X_pre allowed for transmission performed by a transmit device after a previous switching; or a total number of times transmit-device switching occurs within the INIT_COT being less than or equal to a maximum value.

In a possible implementation, X_pre is at least two times of X_post.

In a possible implementation, the first device is a terminal, and the second device is a network device; or the first device is the network device, and the second device is the terminal.

In a possible implementation, the first device is the terminal, and the second device is the network device. A resource for the terminal within the INIT_COT is a resource dynamically scheduled by the network device or a semi-persistently configured resource.

The foregoing solution of the implementations of the disclosure is mainly described from the viewpoint of interaction process of various network elements. It can be understood that, in order to implement the above functions, the terminal includes hardware structures and/or software modules for performing the respective functions. Those skilled in the art should readily recognize that, in combination with the units and algorithmic operations of various examples described in the implementations disclosed herein, the present disclosure can be implemented in hardware or a combination of the hardware and computer software.

Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the terminal in accordance with the foregoing method examples. For example, each functional unit may be divided according to each function, and two or more functions may be integrated in one processing unit. The above-mentioned integrated unit can be implemented in the form of hardware or software program modules. It should be noted that the division of units in the implementations of the present disclosure is schematic, and is merely a logical function division, and there may be other division manners in actual implementation.

Figure 5:
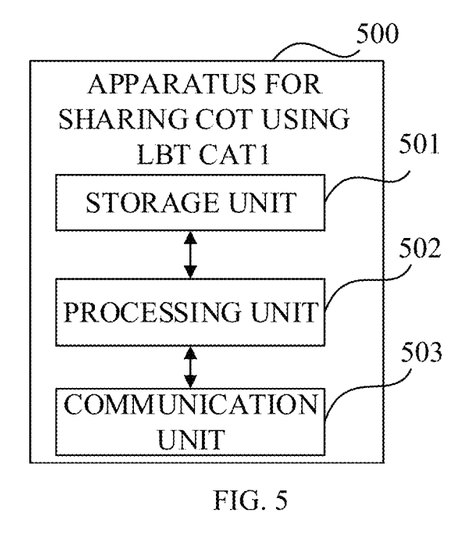
FIG. 5 is a block diagram illustrating function units of an apparatus provided in implementations of the disclosure.

In the case of the integrated unit, FIG. 5 is a block diagram illustrating functional units of the apparatus for sharing COT using LBT CAT1 related in the foregoing implementations. The apparatus 500 for sharing COT using LBT CAT1 is applied to the terminal and includes a processing unit 502 and a communication unit 503. The processing unit 502 is configured to control and manage actions of the terminal, for example, the processing unit 502 is configured to support the terminal to perform the operations at block 101 and block 102 in FIG. 2A and/or other processes of the technology described in the disclosure. The communication unit 503 is configured to support communication between the terminal and other devices. The terminal further includes a storage unit 501 configured to store program codes and data of the terminal.

The processing unit 502 can be a processor or a controller, for example, a central processing unit (CPU), a general-purpose processor, a digital signal processor (DSP), an application specific integrated circuit (ASIC), a field programmable gate array (FPGA), other programmable logic devices, transistor logic devices, hardware components, or any combination thereof. Various exemplary logical blocks, modules, and circuits described in conjunction with the disclosure may be achieved or implemented. The processor also may be a combination realizing computing functions, for example, a combination of one or more microprocessors, a combination of the DSP and the microprocessor, or the like. The communication unit 503 may be a communication interface, a transceiver, a transceiver circuit, or the like. The storage unit 501 may be a memory. When the processing unit 502 is the processor, the communication unit 503 is the communication interface, and the storage unit 501 is the memory, the terminal related in implementations of the disclosure may be the terminal illustrated in FIG. 3.

In a specific implementation, the processing unit 502 is configured to perform any of operations performed by the terminal in the foregoing method implementations, and when performing data transmission such as transmitting, it is possible to invoke the communication unit 503 to complete corresponding operations, which will be described below in detail.

The processing unit 502 is configured to establish an INIT_COT and share the INIT_COT to a second device through the communication unit 503. The INIT_COT is obtained with the LBT CAT1 by the second device and is used for the second device to perform data transmission within the INIT_COT, and a time length of the data transmission is less than or equal to a time length X.

In a possible implementation, X represents one or more values in a time interval set, where the set is a symbol-level set, a value of X is m*S, S represents a length of an OFDM symbol, and m is a positive rational number; or the set is a slot-level set, a value of X is m*SL, SL represents a slot length, and m is a positive rational number.

In a possible implementation, a value of S and a value of SL each are associated with a subcarrier spacing.

In a possible implementation, the value of X is associated with a data type transmitted within the INIT_COT by the second device.

In a possible implementation, the data type transmitted within the INIT_COT by the second device includes at least one of: a control signal, a broadcast signal, an access signal, or a reference signal. The control signal includes information carried by at least one channel of: a PDCCH or a PUCCH. The broadcast signal includes information carried by a PBCH or system information carried by a PDSCH. The access signal includes information carried by a PRACH. The reference signal includes at least one of: a CSI-RS, an SRS, or an SSB.

In a possible implementation, an association relation between the value of X and the data type transmitted within the INIT_COT by the second device is as follows. On condition that the data type is the SSB, X represents 4 symbols and X=4*S, or X represents one slot and X=1*SL. On condition that the data type is the information carried by the PDCCH, X=m*S, where m=1, 2, or 3. On condition that the data type is the information carried by the PUCCH or the SRS, X=m*S, where m=1, 2, 3, 4, 5, 6, 7, 8, 9, 10, 11, 12, 13, or 14. On condition that the data type is the system information carried by the PDSCH, X=m*SL, where m=0.5 or 1.

In a possible implementation, the second device performs the data transmission within the INIT_COT on condition that the second device satisfies a first condition.

In a possible implementation, the first condition includes at least one of: only one switching point existing between the second device and the first device after establishing the INIT_COT by the first device, where the only one switching point means that transmit-device switching occurs only once within the INIT_COT, i.e., switch from the first device to the second device; more than one transmit-device switching occurring within the INIT_COT, i.e., more than one switching point for the transmit device existing between the first device and the second device, where a maximum time length X_post allowed for transmission performed by a transmit device after each switching is less than or equal to a maximum time length X_pre allowed for transmission performed by a transmit device after a previous switching; or a total number of times transmit-device switching occurs within the INIT_COT being less than or equal to a maximum value.

In a possible implementation, X_pre is at least two times of X_post.

In a possible implementation, the first device is a terminal, and the second device is a network device; or the first device is the network device, and the second device is the terminal.

In a possible implementation, the first device is the terminal, and the second device is the network device. A resource for the terminal within the INIT_COT is a resource dynamically scheduled by the network device or a semi-persistently configured resource.

Figure 6:
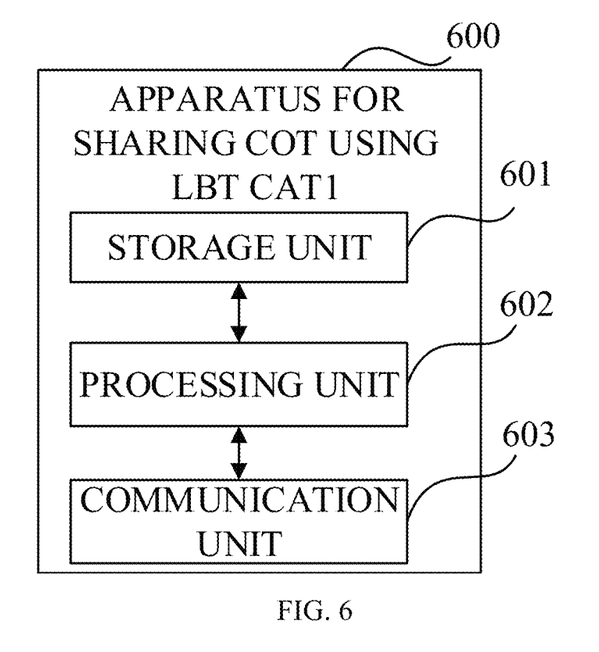
FIG. 6 is a block diagram illustrating function units of an apparatus provided in implementations of the disclosure.

In the case of the integrated unit, FIG. 6 is a block diagram illustrating functional units of the apparatus for sharing COT using LBT CAT1 related in the foregoing implementations. The apparatus 600 for sharing COT using LBT CAT1 is applied to the network device and includes a processing unit 602 and a communication unit 603. The processing unit 602 is configured to control and manage actions of the network device, for example, the processing unit 602 is configured to support the network device to perform the operations at block 202 and block 204 in FIG. 2A and/or other processes of the technology described in the disclosure. The communication unit 603 is configured to support communication between the network device and other devices. The network device further includes a storage unit 601 configured to store program codes and data of the network device.

The processing unit 602 can be a processor or a controller, for example, a CPU, a general-purpose processor, a DSP, an ASIC, a FPGA, other programmable logic devices, transistor logic devices, hardware components, or any combination thereof. Various exemplary logical blocks, modules, and circuits described in conjunction with the disclosure may be achieved or implemented. The processor also may be a combination realizing computing functions, for example, a combination of one or more microprocessors, a combination of the DSP and the microprocessor, or the like. The communication unit 603 may be a communication interface, a transceiver, a transceiver circuit, or the like. The storage unit 601 may be a memory. If the processing unit 602 is a processor, the communication unit 603 is a communication interface, and the storage unit 601 is a memory, the terminal related in implementations of the disclosure may be the network device illustrated in FIG. 4.

The processing unit 602 is configured to obtain an INIT_COT with the LBT CAT1 through the communication unit 603, where the INIT_COT is established and shared with a second device by a first device, and is configured to perform data transmission within the INIT_COT through the communication unit 603, where a time length of the data transmission is less than or equal to a time length X.

In a possible implementation, X represents one or more values in a time interval set, where the set is a symbol-level set, a value of X is m*S, S represents a length of an OFDM symbol, and m is a positive rational number; or the set is a slot-level set, a value of X is m*SL, SL represents a slot length, and m is a positive rational number.

In a possible implementation, a value of S and a value of SL each are associated with a subcarrier spacing.

In a possible implementation, the value of X is associated with a data type transmitted within the INIT_COT by the second device.

In a possible implementation, the data type transmitted within the INIT_COT by the second device includes at least one of: a control signal, a broadcast signal, an access signal, or a reference signal. The control signal includes information carried by at least one channel of: a PDCCH or a PUCCH. The broadcast signal includes information carried by a PBCH or system information carried by a PDSCH. The access signal includes information carried by a PRACH. The reference signal includes at least one of: a CSI-RS, an SRS, or an SSB.

In a possible implementation, an association relation between the value of X and the data type transmitted within the INIT_COT by the second device is as follows. On condition that the data type is the SSB, X represents 4 symbols and X=4*S, or X represents one slot and X=1*SL. On condition that the data type is the information carried by the PDCCH, X=m*S, where m=1, 2, or 3. On condition that the data type is the information carried by the PUCCH or the SRS, X=m*S, where m=1, 2, 3, 4, 5, 6, 7, 8, 9, 10, 11, 12, 13, or 14. On condition that the data type is the system information carried by the PDSCH, X=m*SL, where m=0.5 or 1.

In a possible implementation, the second device performs the data transmission within the INIT_COT on condition that the second device satisfies a first condition.

In a possible implementation, the first condition includes at least one of: only one switching point existing between the second device and the first device after establishing the INIT_COT by the first device, where the only one switching point means that transmit-device switching occurs only once within the INIT_COT, i.e., switch from the first device to the second device; more than one transmit-device switching occurring within the INIT_COT, i.e., more than one switching point for the transmit device existing between the first device and the second device, where a maximum time length X_post allowed for transmission performed by a transmit device after each switching is less than or equal to a maximum time length X_pre allowed for transmission performed by a transmit device after a previous switching; or a total number of times transmit-device switching occurs within the INIT_COT being less than or equal to a maximum value.

In a possible implementation, X_pre is at least two times of X_post.

In a possible implementation, the first device is a terminal, and the second device is a network device; or the first device is the network device, and the second device is the terminal.

In a possible implementation, the first device is the terminal, and the second device is the network device. A resource for the terminal within the INIT_COT is a resource dynamically scheduled by the network device or a semi-persistently configured resource.

A chip is further provided in implementations of the disclosure. The chip includes a processor configured to invoke and execute computer programs stored in a memory, to cause a device equipped with the chip to execute some or all of the operations described by the terminal in the above-mentioned method implementations.

A computer-readable storage medium is further provided in implementations of the disclosure. The computer-readable storage medium is configured to store a computer program used for performing electronic data interchange, where the computer program enables a computer to execute some or all of the operations performed by the terminal in the above-mentioned method implementations.

A computer-readable storage medium is further provided in implementations of the disclosure. The computer-readable storage medium is configured to store a computer program used for performing electronic data interchange, where the computer program enables a computer to execute some or all of the operations performed by the network device in the above-mentioned method implementations.

A computer program product is further provided in implementations of the disclosure. The computer program product includes a computer program which can be operated to enable a computer to execute some or all of the operations performed by the terminal in the above-mentioned method implementations. The computer program product may be a software installation package.

The algorithmic operations and the method described in implementations may be implemented as hardware, or may be implemented by a processor performing software instructions. The software instructions may be composed with corresponding software modules. The software module can be stored in a storage medium such as a random access memory (RAM), a flash memory, a read only memory (ROM), an erasable programmable read-only memory (EPROM), an electrically erasable programmable read-only memory (EEPROM), a register, a hard disc, a mobile hard disc, or a compact disc read-only memory (CD-ROM), or in storage media with any other forms known in this field. An exemplary storage medium is coupled to the processor, so that the processor can read information from the storage medium and can write information to the storage medium. Of course, the storage medium can also be a part of the processor. The processor and the storage medium may be located in an ASIC. In addition, the ASIC may be located in an access network device, a target network device, or a core network device. Of course, the processor and the storage medium may also be presented as discrete components in the access network device, the target network device, or the core network device.

Those skilled in the art can appreciate that, in the above-mentioned one or more implementations, all or part of the described functions can be implemented through software, hardware, firmware, or any other combination thereof. When implemented by software, all or part of the above implementations can be implemented in the form of a computer program product. The computer program product includes one or more computer instructions. When the computer instructions are loaded and executed on a computer, all or part of the processes or functions of the implementations of the disclosure are performed. The computer can be a general-purpose computer, a special-purpose computer, a computer network, or other programmable apparatuses. The computer instructions can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer-accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

The above-mentioned implementations provide further details of the purpose, technical solutions and beneficial effects of the implementations of this disclosure. It can be understood that, the above is only specification implementation manners of the implementations of the disclosure and is not intended to limit the scope of protection of the implementations of the disclosure. Any modification, equivalent arrangements and improvement made on the basis of the technical solution of the implementations of the disclosure shall be included in the scope of protection of the implementations of the disclosure.

What is claimed is:

1. A method for sharing channel occupancy time (COT) using listen before talk category 1 (LBT CAT1), comprising:
    establishing, by a first device, an initiation COT (INIT_COT); and
    sharing, by the first device, the INIT_COT with a second device, the INIT_COT being obtained with the LBT CAT1 by the second device and being used for the second device to perform data transmission within the INIT_COT, and a time length of the data transmission being less than or equal to a time length X;
    wherein the second device performs the data transmission within the INIT_COT on condition that the second device satisfies a first condition, wherein the first condition comprises:
        more than one transmit-device switching occurring within the INIT_COT, and more than one switching point existing between the first device and the second device, wherein a maximum time length X_post allowed for transmission performed by a transmit device after each switching is less than or equal to a maximum time length X_pre allowed for transmission performed by a transmit device after a previous switching.

2. The method of claim 1, wherein X represents one or more values in a time interval set;
    wherein one of the following:
        the set is a symbol-level set, a value of X is m*S, S represents a length of an orthogonal frequency division multiplexing (OFDM) symbol, and m is a positive rational number; and
        the set is a slot-level set, a value of X is m*SL, SL represents a slot length, and m is a positive rational number.

3. The method of claim 2, wherein a value of S and a value of SL each are associated with a subcarrier spacing.

4. The method of claim 1, wherein a value of X is associated with a data type transmitted within the INIT_COT by the second device.

5. The method of claim 4, wherein the data type transmitted within the INIT_COT by the second device comprises at least one of:
    a control signal, wherein the control signal comprises information carried by at least one of: a physical downlink control channel (PDCCH) or a physical uplink control channel (PUCCH);
    a broadcast signal, wherein the broadcast signal comprises information carried by a physical broadcast channel (PBCH) or system information carried by a physical downlink shared channel (PDSCH);
    an access signal, wherein the access signal comprises information carried by a physical random access channel (PRACH); and
    a reference signal, wherein the reference signal comprises at least one of: a channel state information-reference signal (CSI-RS), a sounding reference signal (SRS), or a synchronization signal (SS) and PBCH block (SSB).

6. The method of claim 5, wherein an association relation between the value of X and the data type transmitted within the INIT_COT by the second device comprises one of the following:
    on condition that the data type is the SSB, X representing 4 symbols and X=4*S, or X representing one slot and X=1*SL;
    on condition that the data type is the information carried by the PDCCH, X=m*S, wherein m=1, 2, or 3;
    on condition that the data type is the information carried by the PUCCH or the SRS, X=m*S, wherein m=1, 2, 3, 4, 5, 6, 7, 8, 9, 10, 11, 12, 13, or 14; and
    on condition that the data type is the system information carried by the PDSCH, X=m*SL, wherein m=0.5 or 1.

7. The method of claim 1, wherein X_pre is at least two times of X_post.

8. The method of claim 1, wherein one of the following:
    the first device is a network device, and the second device is a terminal; and the first device is the terminal, and the second device is the network device, and a resource for the terminal within the INIT_COT is a resource dynamically scheduled by the network device or a semi-persistently configured resource.

9. A first device, comprising:
a processor; and
a memory storing a computer program;
wherein the computer program being executed by the processor to cause the processor to:
 establish an initiation channel occupancy time (INIT_COT); and
 share the INIT_COT with a second device, the INIT_COT being obtained with listen before talk category 1 (LBT CAT1) by the second device and being used for the second device to perform data transmission within the INIT_COT, and a time length of the data transmission being less than or equal to a time length X;
wherein the second device performs the data transmission within the INIT_COT on condition that the second device satisfies a first condition, wherein the first condition comprises:
 more than one transmit-device switching occurring within the INIT_COT, and more than one switching point existing between the first device and the second device, wherein a maximum time length X_post allowed for transmission performed by a transmit device after each switching is less than or equal to a maximum time length X_pre allowed for transmission performed by a transmit device after a previous switching.

10. The first device of claim 9, wherein X represents one or more values in a time interval set;
wherein one of the following:
 the set is a symbol-level set, a value of X is m*S, S represents a length of an orthogonal frequency division multiplexing (OFDM) symbol, and m is a positive rational number; and
 the set is a slot-level set, a value of X is m*SL, SL represents a slot length, and m is a positive rational number.

11. The first device of claim 10, wherein a value of S and a value of SL each are associated with a subcarrier spacing.

12. The first device of claim 9, wherein a value of X is associated with a data type transmitted within the INIT_COT by the second device.

13. The first device of claim 12, wherein the data type transmitted within the INIT_COT by the second device comprises at least one of:
 a control signal, wherein the control signal comprises information carried by at least one of: a physical downlink control channel (PDCCH) or a physical uplink control channel (PUCCH);
 a broadcast signal, wherein the broadcast signal comprises information carried by a physical broadcast channel (PBCH) or system information carried by a physical downlink shared channel (PDSCH);
 an access signal, wherein the access signal comprises information carried by a physical random access channel (PRACH); and
 a reference signal, wherein the reference signal comprises at least one of: a channel state information-reference signal (CSI-RS), a sounding reference signal (SRS), or a synchronization signal (SS) and PBCH block (SSB).

14. The first device of claim 13, wherein an association relation between the value of X and the data type transmitted within the INIT_COT by the second device comprises one of the following:
 on condition that the data type is the SSB, X representing 4 symbols and X=4*S, or X representing one slot and X=1*SL;
 on condition that the data type is the information carried by the PDCCH, X=m*S, wherein m=1, 2, or 3;
 on condition that the data type is the information carried by the PUCCH or the SRS, X=m*S, wherein m=1, 2, 3, 4, 5, 6, 7, 8, 9, 10, 11, 12, 13, or 14; and
 on condition that the data type is the system information carried by the PDSCH, X=m*SL, wherein m=0.5 or 1.

15. The first device of claim 9, wherein X_pre is at least two times of X_post.

16. The first device of claim 9, wherein one of the following:
 the first device is a network device, and the second device is a terminal; and
 the first device is the terminal, and the second device is the network device, and a resource for the terminal within the INIT_COT is a resource dynamically scheduled by the network device or a semi-persistently configured resource.

* * * * *